(12) United States Patent
Li et al.

(10) Patent No.: US 12,087,193 B2
(45) Date of Patent: Sep. 10, 2024

(54) DRIVING CIRCUIT

(71) Applicant: TCL CHINA STAR OPTOELECTRONICS TECHNOLOGY CO., LTD., Guangdong (CN)

(72) Inventors: Haoran Li, Shenzhen (CN); Jianfeng Xiao, Shenzhen (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/608,138

(22) PCT Filed: Aug. 24, 2021

(86) PCT No.: PCT/CN2021/114208
§ 371 (c)(1),
(2) Date: Nov. 1, 2021

(87) PCT Pub. No.: WO2023/019607
PCT Pub. Date: Feb. 23, 2023

(65) Prior Publication Data
US 2024/0021123 A1 Jan. 18, 2024

(30) Foreign Application Priority Data
Aug. 17, 2021 (CN) .......................... 202110940693.2

(51) Int. Cl.
G09G 3/20 (2006.01)
(52) U.S. Cl.
CPC .......... *G09G 3/20* (2013.01); *G09G 2320/041* (2013.01); *G09G 2320/043* (2013.01); *G09G 2330/021* (2013.01); *G09G 2330/08* (2013.01)

(58) Field of Classification Search
CPC ............... G09G 3/20; G09G 2320/041; G09G 2320/043; G09G 2330/021;
(Continued)

(56) References Cited

U.S. PATENT DOCUMENTS

| 2015/0270703 A1 | 9/2015 | Reiter et al. |
| 2017/0104416 A1 | 4/2017 | Kataoka et al. |

FOREIGN PATENT DOCUMENTS

| CN | 1797914 A | 7/2006 |
| CN | 202050564 U | 11/2011 |

(Continued)

OTHER PUBLICATIONS

Chinese Office Action issued in corresponding Chinese Patent Application No. 202110940693.2 dated Jul. 11, 2023, pp. 1-6.
(Continued)

*Primary Examiner* — Abhishek Sarma
(74) *Attorney, Agent, or Firm* — PV IP PC; Wei Te Chung; Zhigang Ma (57) ABSTRACT

A driving circuit is provided and includes a first transistor electrically connected to a first control terminal, a first voltage terminal and a first node; and a second transistor electrically connected to a second control terminal, the first node and a ground terminal; and an inductor, a first terminal thereof is electrically connected to the first node, and a second terminal thereof is electrically connected to a second voltage terminal; and a shunt module electrically connected to the first node and the ground terminal, and the shunt module is configured to provide a current loop to shunt a current flowing through the second transistor.

14 Claims, 5 Drawing Sheets

(58) Field of Classification Search
CPC ......... G09G 2330/08; G09G 2330/028; G09G 2330/045; G09G 2330/04; G06F 1/3265; G06F 1/206
See application file for complete search history.

(56) References Cited

FOREIGN PATENT DOCUMENTS

| CN | 203104083 U | 7/2013 |
|----|-------------|--------|
| CN | 204168548 U | 2/2015 |
| CN | 205123583 U | 3/2016 |
| CN | 106409233 A | 2/2017 |
| CN | 205921528 U | 2/2017 |
| CN | 109659925 A | 4/2019 |
| CN | 209930559 U | 1/2020 |
| CN | 112398186 A | 2/2021 |

OTHER PUBLICATIONS

Chinese Office Action issued in corresponding Chinese Patent Application No. 202110940693.2 dated Apr. 6, 2023, pp. 1-6.
International Search Report in International application No. PCT/CN2021/114208, mailed on May 12, 2022.
Written Opinion of the International Search Authority in International application No. PCT/CN2021/114208, mailed on May 12, 2022.

DRIVING CIRCUIT

FIELD OF THE INVENTION

The present application relates to a display technology field, and more particularly to a driving circuit.

BACKGROUND OF THE INVENTION

With the update of production lines of the display panel generation, the size of the display panel is getting larger and larger, and the resolution of the display panel is getting higher and higher. However, a display panel with a larger size, higher resolution and a higher refresh rate often means higher power consumption. Therefore, for the power management integrated chip of the driving circuit, the operating temperature of a 55-inch display panel under normal screen is 60 degrees Celsius; while for a 75-inch display panel, the operating temperature under normal screen may increase to 65 degrees Celsius to 70 degrees Celsius. The increase in temperature does not only bring the risk of failure of the power management integrated chip in a high-temperature environment but also shortens the service life of the power management integrated chip.

For the conventional power management integrated chip, in order to pursue the extreme cost, the driving circuit often adopts a synchronous rectification architecture, which means that there will be two transistors in the power management integrated chip for switching. When the driving circuit is heavily loaded, the switching loss of the two transistors will be very large, and the power management integrated chip will generate heat seriously.

SUMMARY OF THE INVENTION

The present application provides a driving circuit, which can reduce the risk of high-temperature failure of a power management integrated chip and increase the service life of the power management integrated chip.

First, the present application provides a driving circuit, including:
- a first transistor, and a gate of which is electrically connected to a first control terminal, and a source of the first transistor is electrically connected to a first voltage terminal, and a drain of the first transistor is electrically connected to a first node;
- a second transistor, and a gate of which is electrically connected to a second control terminal, and a source of the second transistor is electrically connected to the first node and a drain of the second transistor is electrically connected to a ground terminal;
- an inductor, and a first terminal of which is electrically connected to the first node, and a second terminal of the inductor is electrically connected to a second voltage terminal; and
- a shunt module, electrically connected to the first node and the ground terminal, and the shunt module is configured to provide a current loop to shunt a current flowing through the second transistor;
- the shunt module includes a diode, and a positive terminal of the diode is electrically connected to the ground terminal, and a negative terminal of the diode is electrically connected to the first node;
- the first transistor and the second transistor are both arranged in a power management integrated chip.

In the driving circuit provided by the present application, the diode is a Schottky diode.

In the driving circuit provided by the present application, a voltage drop of the diode ranges from 0.3 volts to 0.7 volts.

In the driving circuit provided by the present application, the first transistor is one of an N-type transistor or a P-type transistor, and the second transistor is an other of the N-type transistor or the P-type transistor.

In the driving circuit provided by the present application, the driving circuit further includes a filter module electrically connected to the second voltage terminal and the ground terminal, and the filter module is configured to filter a voltage of the second voltage terminal.

In the driving circuit provided by the present application, the filter module includes a first capacitor and a second capacitor; a first terminal of the first capacitor is electrically connected to the first voltage terminal, and a second terminal of the first capacitor is electrically connected to the ground terminal; a first terminal of the second capacitor is electrically connected to the first voltage terminal, and a second terminal of the second capacitor is electrically connected to the ground terminal.

In the driving circuit provided by the present application, the driving circuit further includes a feedback module electrically connected to the second voltage terminal, and the feedback module is used to detect a voltage of the second voltage terminal to adjust signals of the first control terminal and the second control terminal.

In the driving circuit provided by the present application, the feedback module includes a first resistor and a second resistor; a first terminal of the first resistor is electrically connected to the second voltage terminal, and a second terminal of the first resistor is electrically connected to a feedback terminal; a first terminal of the second resistor is electrically connected to the ground terminal, and a second terminal of the second resistor is electrically connected to the feedback terminal.

Second, the present application provides a driving circuit, including:
- a first transistor, and a gate of which is electrically connected to a first control terminal, and a source of the first transistor is electrically connected to a first voltage terminal, and a drain of the first transistor is electrically connected to a first node;
- a second transistor, and a gate of which is electrically connected to a second control terminal, and a source of the second transistor is electrically connected to the first node and a drain of the second transistor is electrically connected to a ground terminal;
- an inductor, and a first terminal of which is electrically connected to the first node, and a second terminal of the inductor is electrically connected to a second voltage terminal; and
- a shunt module, electrically connected to the first node and the ground terminal, and the shunt module is configured to provide a current loop to shunt a current flowing through the second transistor.

In the driving circuit provided by the present application, the shunt module includes a diode, and a positive terminal of the diode is electrically connected to the ground terminal, and a negative terminal of the diode is electrically connected to the first node.

In the driving circuit provided by the present application, the diode is a Schottky diode.

In the driving circuit provided by the present application, a voltage drop of the diode ranges from 0.3 volts to 0.7 volts.

In the driving circuit provided by the present application, the first transistor is one of an N-type transistor or a P-type transistor, and the second transistor is an other of the N-type transistor or the P-type transistor.

In the driving circuit provided by the present application, the driving circuit further includes a filter module electrically connected to the second voltage terminal and the ground terminal, and the filter module is configured to filter a voltage of the second voltage terminal.

In the driving circuit provided by the present application, the filter module includes a first capacitor and a second capacitor; a first terminal of the first capacitor is electrically connected to the first voltage terminal, and a second terminal of the first capacitor is electrically connected to the ground terminal; a first terminal of the second capacitor is electrically connected to the first voltage terminal, and a second terminal of the second capacitor is electrically connected to the ground terminal.

In the driving circuit provided by the present application, the driving circuit further includes a feedback module electrically connected to the second voltage terminal, and the feedback module is used to detect a voltage of the second voltage terminal to adjust signals of the first control terminal and the second control terminal.

In the driving circuit provided by the present application, the feedback module includes a first resistor and a second resistor; a first terminal of the first resistor is electrically connected to the second voltage terminal, and a second terminal of the first resistor is electrically connected to a feedback terminal; a first terminal of the second resistor is electrically connected to the ground terminal, and a second terminal of the second resistor is electrically connected to the feedback terminal.

In the driving circuit provided by the present application, the first transistor and the second transistor are both arranged in a power management integrated chip.

The driving circuit provided by the present application provides a conduction loop through the shunt module to shunt the current flowing through the second transistor, thereby avoiding excessive current flowing through the second transistor and reducing the heat generated by the second transistor. The risk of high-temperature failure of a power management integrated chip can be reduced to increase the service life of the power management integrated chip.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments. It is clear that the described embodiments are merely part of embodiments of the present application, but not all embodiments. Based on the embodiments of the present application, all other embodiments to those of skilled in the premise of no creative efforts obtained, should be considered within the scope of protection of the present application. It should be understood that the specific embodiments described herein are merely for illustrating and explaining the present application and are not intended to limit the present application. Besides, the terminologies "first" and "second" in the claims and specification of the present application are used for distinguishing different objects but not for describing the specific sequence.

The embodiment of the present application provides a driving circuit, which can reduce the risk of high-temperature failure of a power management integrated chip and increase the service life of the power management integrated chip. The detail descriptions are introduced below. It should be noted that the order of description in the following embodiments is not meant to limit the preferred order of the embodiments. The transistors used in all the embodiments of the present application can be thin film transistors or field effect transistors or other devices with the same characteristics.

In addition, the transistors used in the embodiments of the present application may include P-type transistors and/or N-type transistors. When the gate of the P-type transistor is low, the source and the drain are turned on; when the gate is high, the source and the drain are turned off. When the gate of the N-type transistor is high, the source and the drain are turned on; when the gate is low, the source and the drain are turned off.

Figure 1:
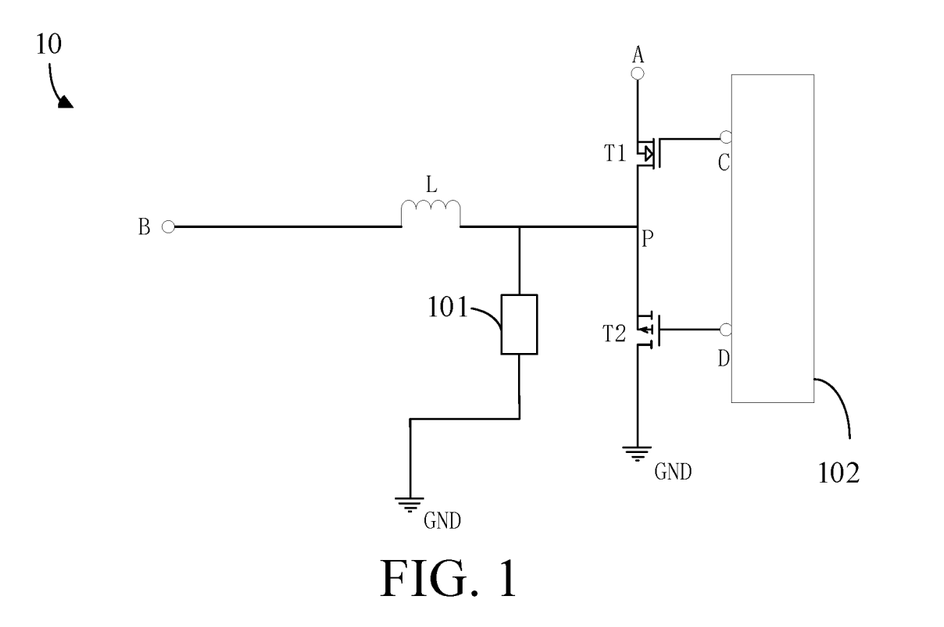
FIG. 1 is a first structure diagram of a driving circuit provided by an embodiment of the application.

Referring to FIG. 1. FIG. 1 is a first structure diagram of a driving circuit provided by an embodiment of the application. As shown in FIG. 1, the driving circuit 10 provided by the embodiment of the present application includes a first transistor T1, a second transistor T2, an inductor L and a shunt module 101. A gate of the first transistor T1 is electrically connected to a first control terminal C, and a source of the first transistor T1 is electrically connected to a first voltage terminal A, and a drain of the first transistor T1 is electrically connected to a first node P. A gate of the second transistor T2 is electrically connected to a second control terminal D, and a source of the second transistor T2 is electrically connected to the first node P and a drain of the second transistor T2 is electrically connected to a ground terminal GND. The shunt module 101 is electrically connected to the first node P and the ground terminal GND. The shunt module 101 is configured to provide a current loop to shunt a current flowing through the second transistor T2.

The first voltage terminal A is a voltage input terminal, and the second voltage terminal B is a voltage output terminal. In the display panel industry, for the existing power management integrated chip, in order to pursue the extreme cost, the driving circuit 10 often adopts a synchronous rectification architecture. The driving circuit 10 provided by the embodiment of the present application adopts a synchronous rectification architecture so that an input voltage of the first voltage terminal A is smaller than an output voltage of the second voltage terminal B. The input voltage received from the first voltage terminal A is controlled by the switching of the first transistor T1 and the second transistor T2, and then through the freewheeling effect of the inductor L to complete the step-down action, and the output voltage is generated at the second voltage terminal B.

Specifically, when the first transistor T1 is turned on and the second transistor T2 is turned off, the first voltage terminal A charges the second voltage terminal B and the inductor L, and at this time, the current flows from the first transistor T1 to the inductor L; when the first transistor T1 is turned off and the second transistor T2 is turned on, the inductor L continues to flow and continues to charge the second voltage terminal B, and at this time, the current flows from the second transistor T2 and the shunt module 101 to the inductor L. Namely, the driving circuit 10 provided by the embodiment of the present application provides a current loop through the shunt module 101 to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

The first transistor T1 and the second transistor T2 need a same frequency signal to drive in a complementary manner to ensure that when the first transistor T1 is turned on, the second transistor T2 is turned off; when the first transistor T1 is turned off, the second transistor T2 is turned on. Specifically, when the transistor is configured as a synchronous rectifier, the source of the transistor is connected to a positive terminal of a power supply, and the drain of the transistor is connected to a negative terminal of the power supply, so that the current flows from the source to the drain when it is turned on.

In some embodiments, the first transistor T1 is one of an N-type transistor or a P-type transistor, and the second transistor T2 is the other of the N-type transistor or the P-type transistor.

The first transistor T1 and the second transistor T2 are both arranged in a power management integrated chip. In some embodiments, the inductor L and the shunt module 101 can be arranged outside the power management integrated chip. Certainly, in some embodiments, the inductor L and the shunt module 101 can be arranged in the power management integrated chip.

Furthermore, the driving circuit 10 further includes a control module 102. The control module 102 includes a first control terminal C and a second control terminal D. The control module 102 is configured to output a first control signal to the first control terminal C. The control module 102 is configured to output a second control signal to the second control terminal D. The first transistor T1 is turned on or off according to the first control signal. The second transistor T2 is turned on or off according to the second control signal.

Figure 2:
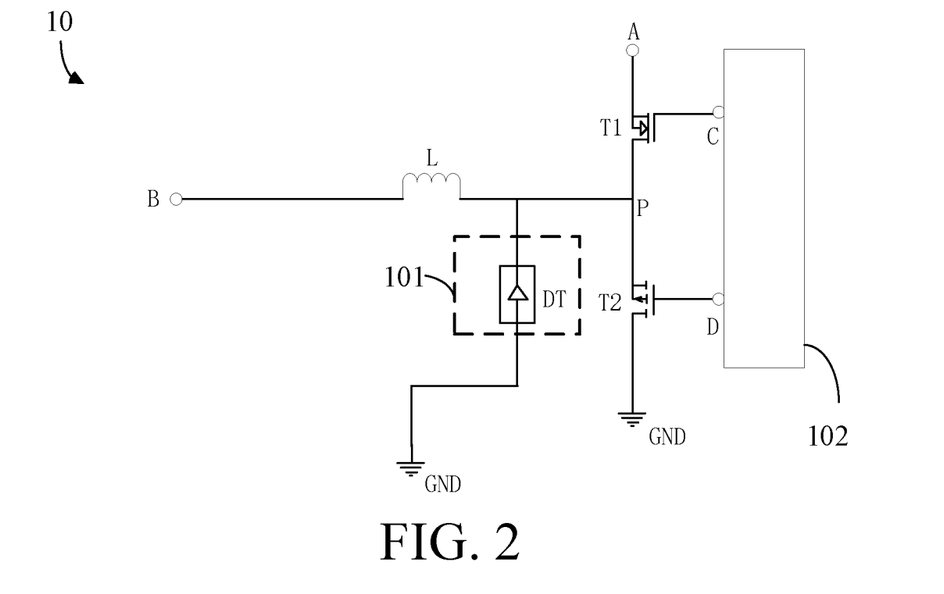
FIG. 2 is a first circuit diagram of a driving circuit provided by an embodiment of the application.

Please refer to FIG. 2. FIG. 2 is a first circuit diagram of a driving circuit provided by an embodiment of the application. As shown in FIG. 1 and FIG. 2, the shunt module 101 includes a diode DT, and a positive terminal of the diode DT is electrically connected to the ground terminal GND, and a negative terminal of the diode DT is electrically connected to the first node P.

Specifically, when the first transistor T1 is turned on and the second transistor T2 is turned off, the first voltage terminal A charges the second voltage terminal B and the inductor L, and at this time, the current flows from the first transistor T1 to the inductor L; when the first transistor T1 is turned off and the second transistor T2 is turned on, the inductor L continues to flow and continues to charge the second voltage terminal B, and at this time, the current flows from the second transistor T2 and the diode DT to the inductor L. Namely, the driving circuit 10 provided by the embodiment of the present application provides a current loop through the diode DT to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

The diode DT can be a Schottky diode. It can be understood that a turn-on voltage drop of the Schottky diode is relatively low, and the Schottky diode can be used as a freewheeling diode in the driving circuit 10. In the embodiment of the present application, a voltage drop of the Schottky diode is between 0.3 volts and 0.7 volts.

Figure 3:
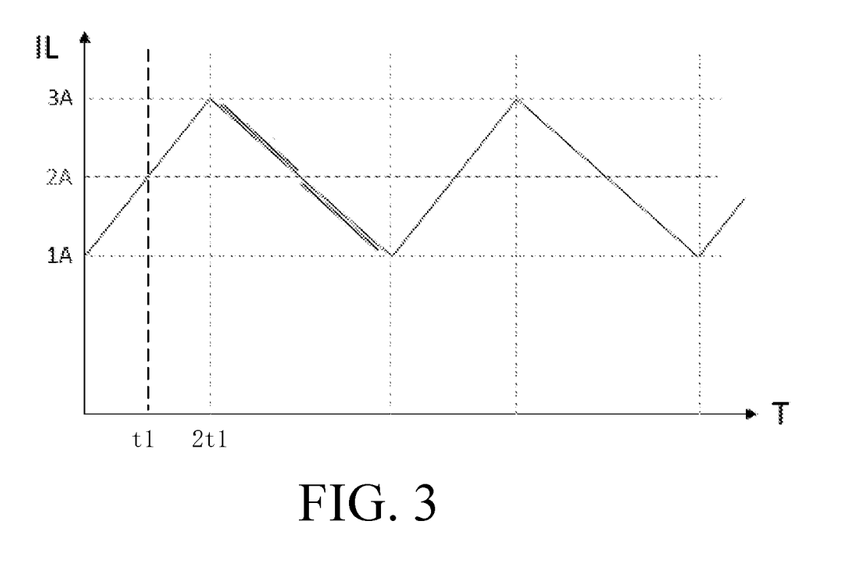
FIG. 3 is a current waveform of an inductor at different stages in the driving circuit provided by an embodiment of the application.

Referring to FIG. 3. FIG. 3 is a current waveform of an inductor at different stages in the driving circuit provided by an embodiment of the application. As shown in FIG. 2 and FIG. 3, assuming that the maximum value of an inductor current IL is 3 amperes and the minimum value is 1 ampere, the voltage drop of the Schottky diode is 0.4 volts, and an impedance of the second transistor T2 is 200 milliohms. Then, when IL*200 mΩ>VF, the flow path of the inductor current IL is mainly provided by the Schottky diode, wherein IL is the inductor current and VF is the voltage drop of the Schottky diode. Therefore, the inductor current IL is 2 amperes. Namely, when the second transistor T2 is turned on, the Schottky diode provides a current flow path for the inductor current IL between 2 amperes and 3 amperes, and a current flow path for the inductor current IL between 1 ampere and 2 amperes is mainly provided by the second transistor T2.

When the driving circuit 10 is not configured with a Schottky diode, the current flowing through the second transistor $$T2 = \int_0^{2t1} \frac{1}{t1}x + 1 = 4t1$$

When the driving circuit 10 is configured with a Schottky diode, the current flowing through the second transistor $$T2 = \int_0^{t1} \frac{1}{t1}x + 1 = \frac{3}{2}t1$$

For the second transistor T2, the current flowing through the second transistor T2 is reduced by 62.5% when the driving circuit 10 is configured with a Schottky diode than when the driving circuit 10 is not configured with a Schottky diode, which greatly reduces the internal heat generation of the power management integrated chip.

Figure 4:
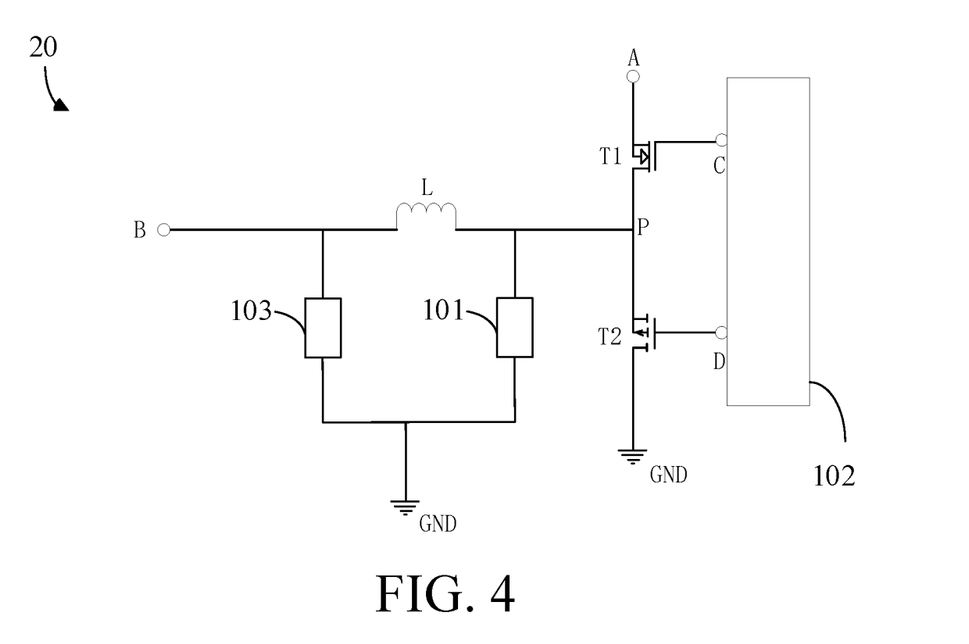
FIG. 4 is a second structure diagram of a driving circuit provided by an embodiment of the application.

Referring to FIG. 4. FIG. 4 is a second structure diagram of a driving circuit provided by an embodiment of the application. The difference between the driving circuit shown in FIG. 4 and the driving circuit shown in FIG. 1 is that the driving circuit shown in FIG. 4 further includes a filter module 103. The filter module 103 is electrically connected to the second voltage terminal B and the ground terminal GND. The filter module 103 is configured to filter a voltage of the second voltage terminal B.

The driving circuit 20 provided by the embodiment of the present application provides a current loop through the shunt module 101 to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

Figure 5:
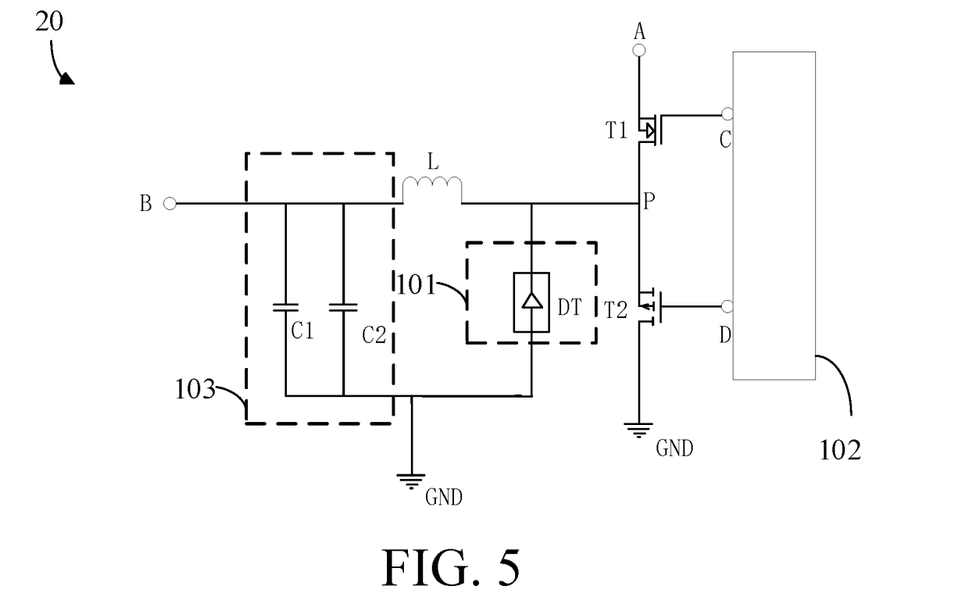
FIG. 5 is a second circuit diagram of a driving circuit provided by an embodiment of the application.

Specifically, please refer to FIG. 5. FIG. 5 is a second circuit diagram of a driving circuit provided by an embodiment of the application. As shown in FIG. 4 and FIG. 5, the filter module 103 includes a first capacitor C1 and a second capacitor C2. A first terminal of the first capacitor C1 is electrically connected to the first voltage terminal A. A second terminal of the first capacitor C1 is electrically connected to the ground terminal GND. A first terminal of the second capacitor C2 is electrically connected to the first voltage terminal A. A second terminal of the second capacitor C2 is electrically connected to the ground terminal GND.

The driving circuit 20 provided by the embodiment of the present application provides a current loop through the diode DT to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

Figure 6:
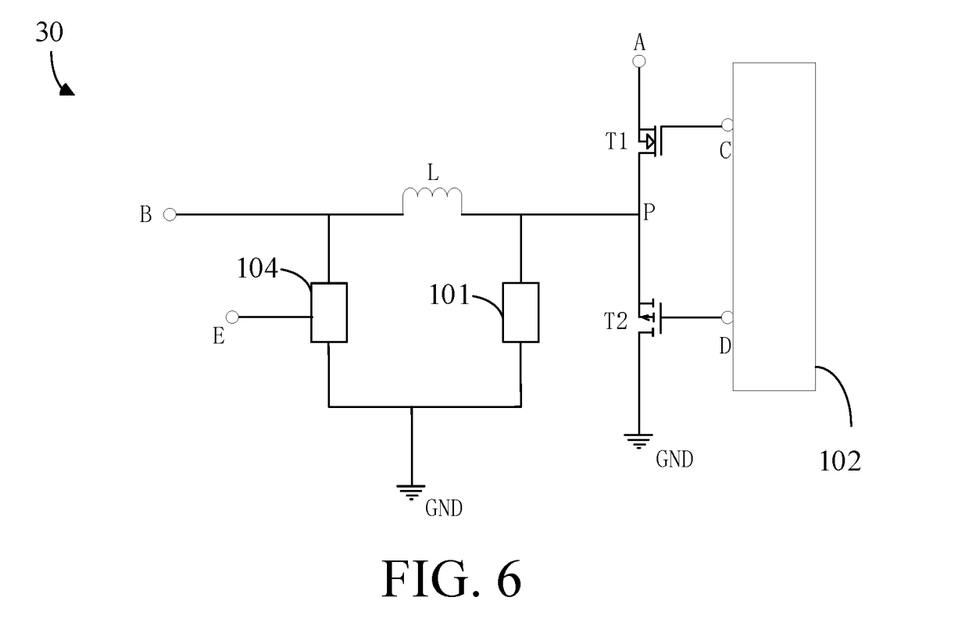
FIG. 6 is a third structure diagram of a driving circuit provided by an embodiment of the application.

Please refer to FIG. 6. FIG. 6 is a third structure diagram of a driving circuit provided by an embodiment of the application. The difference between the driving circuit shown in FIG. 6 and the driving circuit shown in FIG. 1 is that the driving circuit shown in FIG. 6 further includes a feedback module 104. The feedback module 104 is electrically connected to the second voltage terminal B. The feedback module 104 is used to detect a voltage of the second voltage terminal B to adjust signals of the first control terminal C and the second control terminal D.

Figure 7:
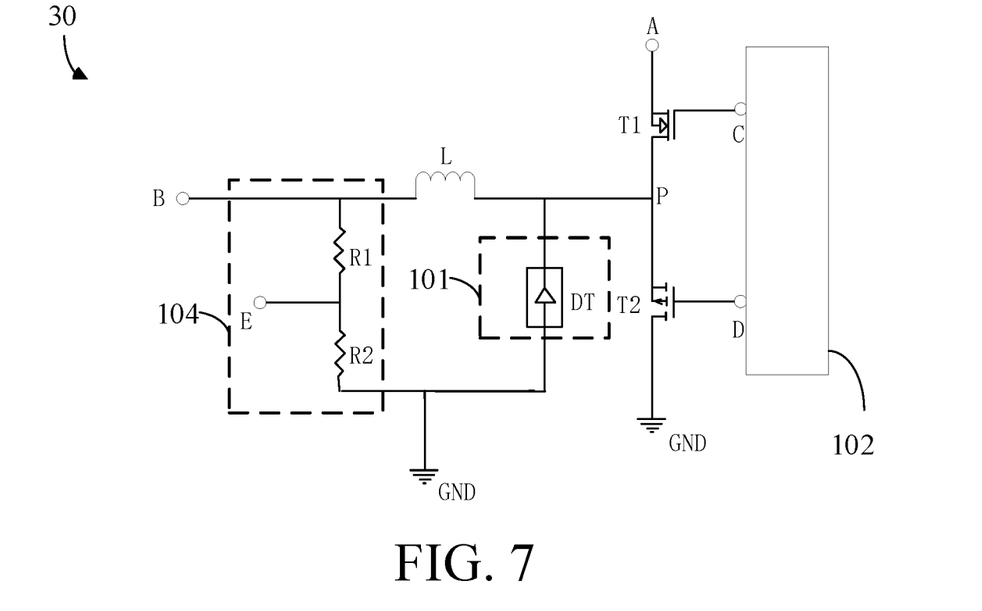
FIG. 7 is a third circuit diagram of a driving circuit provided by an embodiment of the application.

The driving circuit 30 provided by the embodiment of the present application provides a current loop through the shunt module 101 to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip. Specifically, please refer to FIG. 7. FIG. 7 is a third circuit diagram of a driving circuit provided by an embodiment of the application. As shown in FIG. 6 and FIG. 7, the feedback module 104 includes a first resistor R1 and a second resistor R2. A first terminal of the first resistor R1 is electrically connected to the second voltage terminal B. A second terminal of the first resistor R1 is electrically connected to a feedback terminal E. A first terminal of the second resistor R2 is electrically connected to the ground terminal GND. A second terminal of the second resistor R2 is electrically connected to the feedback terminal E. The feedback terminal E is electrically connected to the control module 102.

The driving circuit 30 provided by the embodiment of the present application provides a current loop through the diode DT to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

Figure 8:
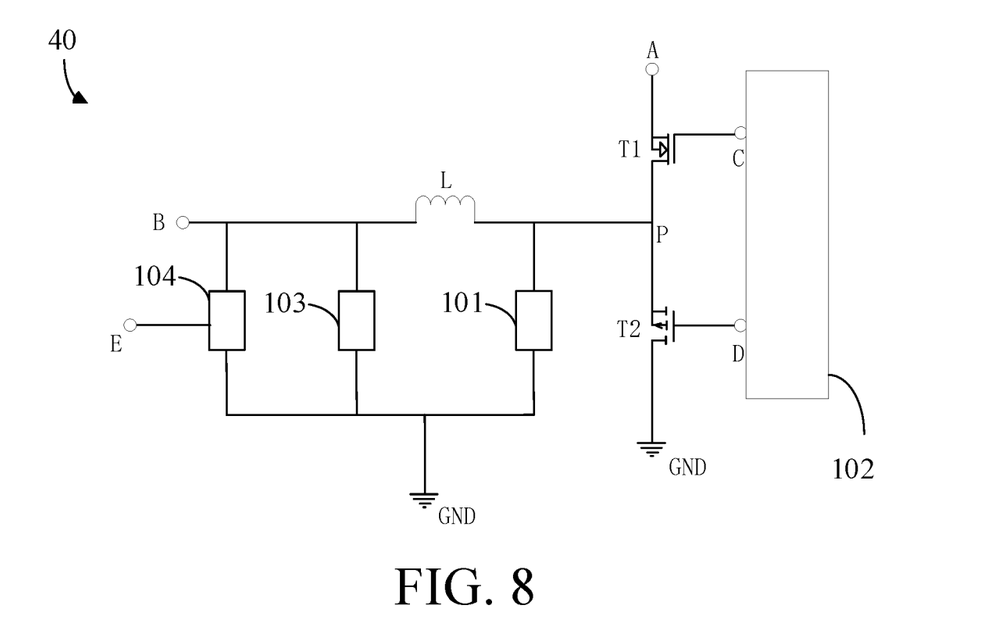
FIG. 8 is a fourth structure diagram of a driving circuit provided by an embodiment of the application.

Referring to FIG. 8. FIG. 8 is a fourth structure diagram of a driving circuit provided by an embodiment of the application. The difference between the driving circuit shown in FIG. 8 and the driving circuit shown in FIG. 1 is that the driving circuit 40 shown in FIG. 8 further includes a filter module 103 and a feedback module 104. The filter module 103 is electrically connected to the second voltage terminal B and the ground terminal GND. The filter module 103 is configured to filter a voltage of the second voltage terminal B. The feedback module 104 is electrically connected to the second voltage terminal B. The feedback module 104 is used to detect a voltage of the second voltage terminal B to adjust signals of the first control terminal C and the second control terminal D.

The driving circuit 40 provided by the embodiment of the present application provides a current loop through the shunt module 101 to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

Figure 9:
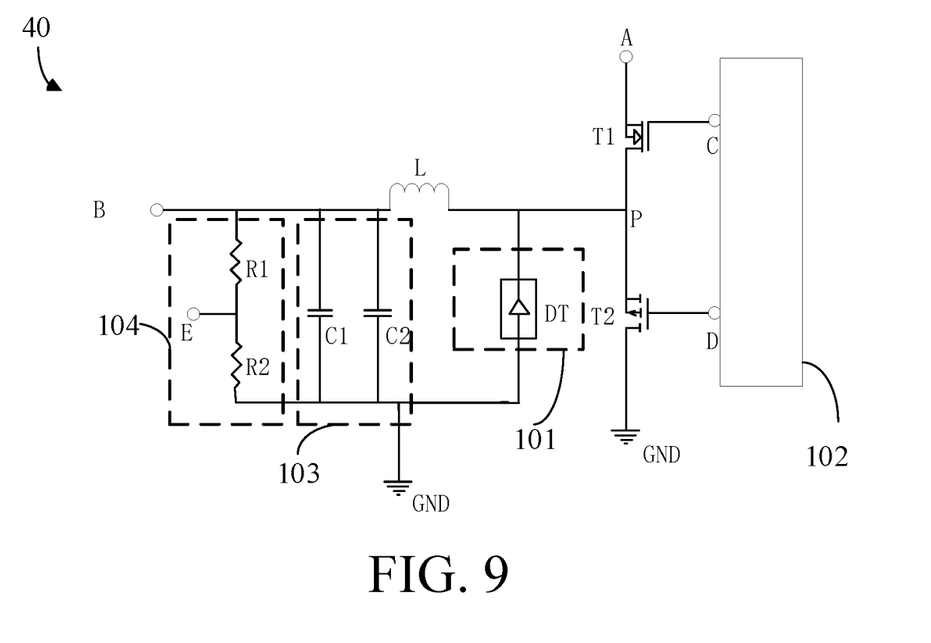
FIG. 9 is a fourth circuit diagram of a driving circuit provided by an embodiment of the application.

Specifically, please refer to FIG. 9. FIG. 9 is a fourth circuit diagram of a driving circuit provided by an embodiment of the application. As shown in FIG. 8 and FIG. 9, the filter module 103 includes a first capacitor C1 and a second capacitor C2. A first terminal of the first capacitor C1 is electrically connected to the first voltage terminal A. A second terminal of the first capacitor C1 is electrically connected to the ground terminal GND. A first terminal of the second capacitor C2 is electrically connected to the first voltage terminal A. A second terminal of the second capacitor C2 is electrically connected to the ground terminal GND. The feedback module 104 includes a first resistor R1 and a second resistor R2. A first terminal of the first resistor R1 is electrically connected to the second voltage terminal B. A second terminal of the first resistor R1 is electrically connected to a feedback terminal E. A first terminal of the second resistor R2 is electrically connected to the ground terminal GND. A second terminal of the second resistor R2 is electrically connected to the feedback terminal E. The feedback terminal E is electrically connected to the control module 102.

The driving circuit 40 provided by the embodiment of the present application provides a current loop through the diode DT to shunt the current flowing through the second transistor T2, thereby avoiding excessive current flowing through the second transistor T2 and reducing the heat generated by the second transistor T2. Thus, the risk of high-temperature failure of a power management integrated chip can be reduced to increase the service life of the power management integrated chip.

The driving circuits provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A driving circuit, comprising:
a first transistor, wherein a gate of the first transistor is electrically connected to a first control terminal, a source of the first transistor is electrically connected to a first voltage terminal, and a drain of the first transistor is electrically connected to a first node;
a second transistor, wherein a gate of the second transistor is electrically connected to a second control terminal, a source of the second transistor is electrically connected to the first node, and a drain of the second transistor is electrically connected to a ground terminal;
an inductor, wherein a first terminal of the inductor is electrically connected to the first node, and a second terminal of the inductor is electrically connected to a second voltage terminal; and
a shunt module electrically connected to the first node and the ground terminal, wherein the shunt module is configured to provide a current loop to shunt a current flowing through the second transistor;
wherein the shunt module comprises a diode, wherein a positive terminal of the diode is electrically connected to the ground terminal, and a negative terminal of the diode is electrically connected to the first node;
the first transistor and the second transistor are both arranged in a power management integrated chip; and
the driving circuit further comprises a filter module comprising a first capacitor and a second capacitor, a first terminal of the first capacitor is electrically connected to the second voltage terminal, a second terminal of the first capacitor is electrically connected to the ground terminal, a first terminal of the second capacitor is electrically connected to the second voltage terminal, and a second terminal of the second capacitor is electrically connected to the ground terminal.

2. The driving circuit according to claim 1, wherein the diode is a Schottky diode.

3. The driving circuit according to claim 2, wherein a voltage drop of the diode ranges from 0.3 volts to 0.7 volts.

4. The driving circuit according to claim 1, wherein the first transistor is one of an N-type transistor or a P-type transistor, and the second transistor is another of the N-type transistor or the P-type transistor.

5. The driving circuit according to claim 1, wherein the driving circuit further includes a feedback module electrically connected to the second voltage terminal, and the feedback module is used to detect a voltage of the second voltage terminal to adjust signals of the first control terminal and the second control terminal.

6. The driving circuit according to claim 5, wherein the feedback module includes a first resistor and a second resistor; a first terminal of the first resistor is electrically connected to the second voltage terminal, and a second terminal of the first resistor is electrically connected to a feedback terminal; a first terminal of the second resistor is electrically connected to the ground terminal, and a second terminal of the second resistor is electrically connected to the feedback terminal.

7. A driving circuit, comprising:
a first transistor, wherein a gate of the first transistor is electrically connected to a first control terminal, a source of the first transistor is electrically connected to a first voltage terminal, and a drain of the first transistor is electrically connected to a first node;
a second transistor, wherein a gate of the second transistor is electrically connected to a second control terminal, a source of the second transistor is electrically connected to the first node, and a drain of the second transistor is electrically connected to a ground terminal;
an inductor, wherein a first terminal of the inductor is electrically connected to the first node, and a second terminal of the inductor is electrically connected to a second voltage terminal; and
a shunt module electrically connected to the first node and the ground terminal, wherein the shunt module is configured to provide a current loop to shunt a current flowing through the second transistor;
wherein the driving circuit further comprises a filter module comprising a first capacitor and a second capacitor, a first terminal of the first capacitor is electrically connected to the second voltage terminal, a second terminal of the first capacitor is electrically connected to the ground terminal, a first terminal of the second capacitor is electrically connected to the second voltage terminal, and a second terminal of the second capacitor is electrically connected to the ground terminal.

8. The driving circuit according to claim 7, wherein the shunt module comprises a diode, a positive terminal of the diode is electrically connected to the ground terminal, and a negative terminal of the diode is electrically connected to the first node.

9. The driving circuit according to claim 8, wherein the diode is a Schottky diode.

10. The driving circuit according to claim 9, wherein a voltage drop of the diode ranges from 0.3 volts to 0.7 volts.

11. The driving circuit according to claim 7, wherein the first transistor is one of an N-type transistor or a P-type transistor, and the second transistor is another of the N-type transistor or the P-type transistor.

12. The driving circuit according to claim 7, wherein the driving circuit further includes a feedback module electrically connected to the second voltage terminal, and the feedback module is used to detect a voltage of the second voltage terminal to adjust signals of the first control terminal and the second control terminal.

13. The driving circuit according to claim 12, wherein the feedback module includes a first resistor and a second resistor; a first terminal of the first resistor is electrically connected to the second voltage terminal, and a second terminal of the first resistor is electrically connected to a feedback terminal; a first terminal of the second resistor is electrically connected to the ground terminal, and a second terminal of the second resistor is electrically connected to the feedback terminal.

14. The driving circuit according to claim 7, wherein the first transistor and the second transistor are both arranged in a power management integrated chip.

* * * * *